United States Patent [19]
Ackley et al.

[11] Patent Number: 5,766,311
[45] Date of Patent: Jun. 16, 1998

[54] MULTI-THERMAL PULSE PSA SYSTEM

[75] Inventors: Mark William Ackley, East Aurora; Frederick Wells Leavitt; Frank Notaro, both of Amherst; Jeffert John Nowobilski, Orchard Park, all of N.Y.

[73] Assignee: Praxair Technology, Inc., Danbury, Conn.

[21] Appl. No.: 676,594

[22] Filed: Jul. 3, 1996

[51] Int. Cl.$^6$ ............................ B01D 53/04; B01D 53/26
[52] U.S. Cl. ........................ 95/115; 95/122; 95/124; 95/126; 95/139
[58] Field of Search .................. 95/99, 106, 114, 95/115, 117, 120–126, 139, 148

[56] References Cited

U.S. PATENT DOCUMENTS

| | | | |
|---|---|---|---|
| 2,790,505 | 4/1957 | Dow | 95/124 |
| 2,910,139 | 10/1959 | Matyear, Jr. | 95/120 X |
| 3,436,839 | 4/1969 | Ellington | 95/115 X |
| 3,738,084 | 6/1973 | Simonet et al. | 95/125 X |
| 3,866,428 | 2/1975 | Simonet et al. | 95/121 X |
| 4,233,038 | 11/1980 | Tao | 95/125 X |
| 4,249,915 | 2/1981 | Sircar et al. | 95/99 |
| 4,324,564 | 4/1982 | Oliker | 95/123 X |
| 4,324,566 | 4/1982 | Jacob et al. | 95/115 |
| 4,398,927 | 8/1983 | Asher et al. | 95/123 X |
| 4,472,178 | 9/1984 | Kumar et al. | 95/99 |
| 4,541,851 | 9/1985 | Bosquain et al. | 55/208 |
| 4,627,856 | 12/1986 | von Gemmingen | 55/31 |
| 4,711,645 | 12/1987 | Kumar | 95/122 X |
| 5,169,413 | 12/1992 | Leavitt | 95/121 X |
| 5,213,593 | 5/1993 | White | 55/26 |
| 5,398,513 | 3/1995 | Klobucar | 95/115 X |
| 5,447,558 | 9/1995 | Acharya | 95/104 |
| 5,520,721 | 5/1996 | Fraysse et al. | 95/114 |

FOREIGN PATENT DOCUMENTS

| | | | |
|---|---|---|---|
| 0004465 | 10/1979 | European Pat. Off. | 95/125 |
| 55-061918 | 5/1980 | Japan | 95/126 |
| 55-140701 | 11/1980 | Japan | 96/126 |
| 61-025640 | 2/1986 | Japan | 95/122 |
| 0617062 | 7/1978 | U.S.S.R. | 95/126 |

*Primary Examiner*—Robert Spitzer
*Attorney, Agent, or Firm*—Robert J. Follett

[57] ABSTRACT

Multiple thermal pulses are employed to regenerate segments of an adsorber bed simultaneously in thermal swing adsorption processes. The invention is particularly applicable to air purification as it helps to reduce purge flow and improve regeneration efficiency.

22 Claims, 4 Drawing Sheets

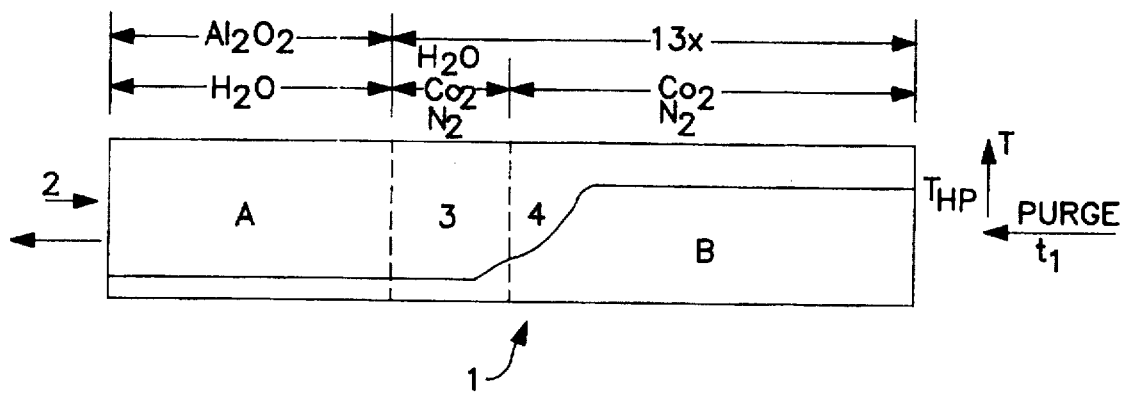
FIG. IA
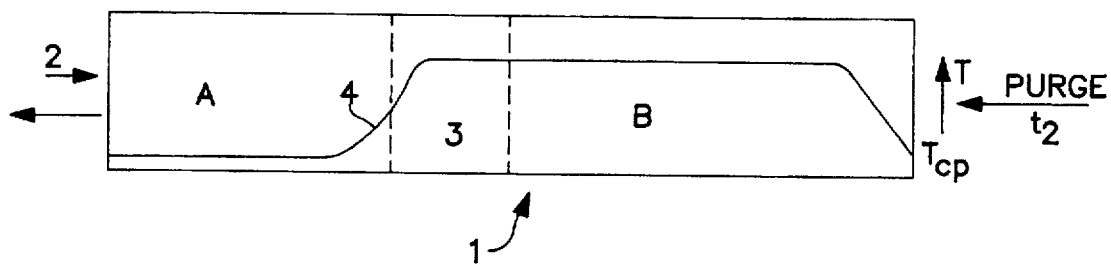
FIG. IB
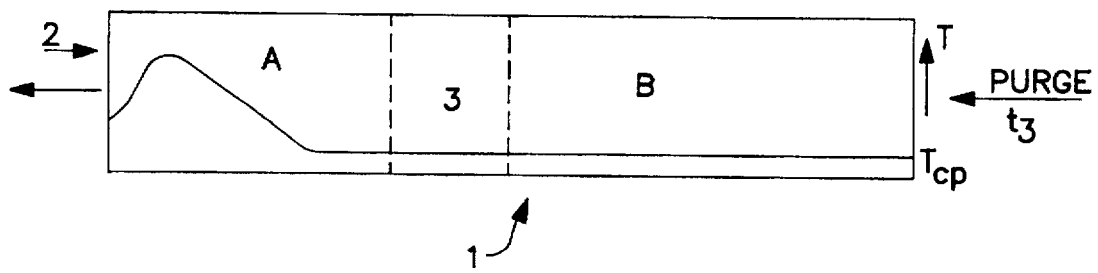
FIG. IC

MULTI-THERMAL PULSE PSA SYSTEM

BACKGROUND OF THE INVENTION

Adsorption separation and purification of fluids have provided the basis for many important commercial processes—often offering both the most efficient and cost-effective method for producing high-purity products. Drying of gases represents one of the earliest applications of both pressure swing adsorption (PSA) and thermal swing adsorption (TSA) processes. Removal of water vapor, carbon dioxide and trace hydrocarbons from air using TSA prior to cryogenic separation has been widely practiced for more than two decades. Although many improvements have been made in such processes, advances in overall efficiency and the broadening of the operating regimes are still possible through shorter cycles, lower regeneration temperature and lower purge requirements.

The introduction of TSA for air prepurification provided a significant advantage over reversing heat exchanger (RHX) technology in that higher product recovery is possible due to TSA's lower requirement for regeneration gas. Early TSA processes employed molecular sieve adsorbent regenerated at high temperatures (>500° F.)—heat was supplied generously to insure complete renewal of the adsorbent. Regeneration energy quickly became perceived as a major process cost, however, and much of the prior art has been devoted to reducing and/or improving the delivery of this heat. There is a limit to minimizing this energy as dictated by the adsorbate/adsorbent properties (namely the heat of adsorption) required for desorption. More recently, higher efficiency/ lower cost solutions have been sought through increased air feed temperature, shorter cycles, smaller beds, and lower regeneration temperatures. Such changes in operating conditions and adsorber design have been accompanied by an increase in the required purge rate. Furthermore, this increasing demand for regeneration gas creates a competition between the product recovery and waste gas requirements, i.e. waste gas needed for after-cooling of the compressed feed and that required for adsorbent regeneration. As a result, the above strategies have resulted in overall process improvements only over relatively narrow operating ranges.

Adsorption processes can be practiced over a wide range of fluid throughput, for fluids containing one or more contaminants, for varying feed impurity concentration levels and to varying demands of product purity. Processes may thus range from isothermal to adiabatic and may involve coadsorption of contaminants and product. Adsorber size will be a strong function of the product purity requirements. It is not surprising that such a diversity of process requirements/conditions produces an equally diverse set of adsorber heat and mass transfer characteristics.

Air purification, while only a subset of adsorption processes in general, nevertheless provides a good cross section of this diversity. For example, instrument air production (moisture levels of 100 ppm generally acceptable), air drying to high purity (moisture levels of 0.1 ppm required), and combined high purity drying and $CO_2$ removal prior to cryogenic air separation represent increasing demands upon both the adsorption and regeneration branches of the cyclic process. Thus, an improvement made to one of these processes is not necessarily relevant to the others.

Prior improvements in cyclic adsorption processes can be divided into the following general areas:

1) adsorbent selection and configuration,
2) process configuration,
3) reduced energy or improved efficiency of regeneration.

Many of these improvements have been directed at one or more of the various air purification processes.

The selection of adsorbents have been made on the basis of the separation capability and capacity for contaminants. Adsorbent layers and segments have been configured with respect to difficulty of contaminant removal and/or difficulty of desorption. Adsorbers containing molecular sieve (typically 13×) or activated alumina only, and those utilizing a layer of activated alumina followed by molecular sieve are common to the industry and have been in service for many years. Deployment of the adsorbent within the process, coupled with the adsorbent material selection, determines the degree of separation/purification attained.

Process configuration addresses the differences between single-cycle processes, where individual processes are differentiated by detailed process step variations, and hybrid or multi-cycle processes.

Examples of the latter include the separate processes for the removal of $CO_2$ and $H_2O$ from air, where the processes may communicate, but generally operate as independent cycles with separate sets of adsorbers. Hybrid processes involve at least one non-adsorption cycle (e.g. RHX for $CO_2$, removal).

The third area involves reduced energy or improved efficiency of regeneration. Large scale processes operating at elevated pressure produce low grade energy (160° F.–220° F.) from heat-of-compression (HOC). This low grade energy is often in considerable excess relative to that required for adsorber regeneration. One process, disclosed in U.S. Pat. No. 4,698,073, incorporates a direct-contact regenerator to extract this HOC for adsorbent regeneration. This replaces the capital cost of a purge heater and its operating expenses with the cost of a regenerator and its associated piping.

Energy released as heat of adsorption can be recovered and applied for regeneration. An $O_2/N_2$ adsorption separation process as in U.S. Pat. No. 4,954,146 incorporates a closed-loop system containing volatile heat exchange fluid in liquid-liquid and vapor-vapor communication between adsorbers.

Compressed air drying processes, such as that disclosed in U.S. Pat. No. 5,213,593, avoid heating the purge for regeneration by capturing the heat of adsorption in an extended length of adsorber bed. This extended adsorbent bed serves only to retain the adsorption heat front. Although the temperature rise accompanying adsorption depends upon the adsorbent/adsorbate properties, the fluid flow and the concentration of the adsorbate to be removed, the resulting temperature will often be lower than that available from HOC. Furthermore, an amount of energy produced in adsorption is ideally just equivalent to that required in regeneration. For these reasons, it is difficult to extract all of the energy required for regeneration from the heat of adsorption. Indeed, the recovered heat has been augmented by the addition of a heater in the bed. The additional adsorbent required to capture the energy of adsorption can be prohibitive in large systems due to the additional costs of the additional adsorbent, larger vessel and increased bed pressure drop.

In a process where large amounts of purge are available from excess product or from an external source of clean inert fluid, TSA is completely replaced by a PSA process, as in U.S. Pat. No. 5,232,474. While PSA air purification successfully eliminates the purge heater and some of the compressed air cooling requirements (e.g. evaporative cooler), the lower efficiency of cold purge regeneration coupled with the higher feed temperature results in high contaminant residuals, low dynamic capacities and large adsorbent mass. These conditions force the process to operate at short cycles (<1 hr.) in order to maintain reasonable adsorber size. These conditions, coupled with the relatively high purge fractions (of the order of 50% of the feed), result in high adsorbent pressure drop and increased loss of compressed feed during the depressurization step all of which tend to offset the savings gained from eliminating the purge heater and feed-side evaporative cooler.

Vacuum desorption has been combined with bed heating for the $CO_2$ desorption stage of regeneration in a natural gas purification process (U.S. Pat. No. 3,738,084). Although evacuation assists in reducing the contaminant partial pressure and can offset some of the heating and/or purge requirement, void gas losses are significantly increased and the additional cost of a vacuum pump is incurred.

Staging of the regeneration steps represents the most common approach of the prior art in attempting to improve regeneration efficiency. In "staging," various bed segments or layers, often defined by the contaminants adsorbed within, are desorbed in succession or in series. Successive regeneration stages for the desorption of $CO_2$ and $H_2O$ have been described, for example, in U.S. Pat. Nos. 3,738,084 and 4,627,856.

Increased rates of adsorber heating have been claimed in some processes by replacing "indirect" methods (externally-heated purge) by "direct" methods involving heaters embedded in or surrounding the adsorber. See for example, U.S. Pat. Nos. 2,747,681, 3,594,983, 3,738,084, 4,541,851 and 3,335,546. In the first three of these inventions, the complete adsorber (or subsections of the adsorber) are heated entirely to the regeneration temperature. This heating may be coupled with purging, venting and/or evacuation (usually in a staged manner) to achieve a quasi-isothermal desorption of the adsorbates. A disadvantage in these methods, however, is that all of the adsorbent is left at the high regeneration temperature at the end of the desorption step. This residual energy stored in the adsorbent mass is exhausted as waste during the cooling step. An improvement over these schemes is made in U.S. Pat. No. 3,378,084 by heating only the $CO_2$ section, with the residual energy in this section recovered in the subsequent cooling step and used for heating the $H_2O$ layer. Although the entire adsorber is subjected to heating in U.S. Pat. No. 3,335,546, the adsorbent is heated progressively from one end to the other. This results in a thermal gradient dispersed over much of the bed during hot regeneration. Similar to the other processes described above, the entire bed reaches the regeneration temperature by the end of desorption. All of these processes are characterized by high thermal driving forces. A heater placed in the adsorber, as in U.S. Pat. No. 4,541,851, provides internal heating of the purge as an alternative to external purge heating.

One such thermal treatment which is used in desorption of TSA processes is "thermal pulse" regeneration. In this process a single thermal pulse is induced by supplying a purge at a temperature elevated with respect to the that of the adsorbent. The direction of the purge flow in the desorption phase is usually opposite to that of the feed stream in the adsorption phase of the cycle. Most of the desorption occurs in a narrow zone of the adsorbent, over which a thermal gradient develops. This zone containing the gradient or "heat front" moves through the bed leaving reactivated material behind at the elevated temperature.

After the heat front has traversed a portion of the bed, the hot purge is replaced by a cool purge.

The cool purge serves to transfer the heat stored in the reactivated adsorbent to the remaining contaminated section of the adsorber, leaving the reactivated adsorbent at the cool purge temperature.

If a small residual of contaminant is allowed to remain at the adsorber feed inlet, the heat pulse is degraded and retained in the bed while most of the energy is consumed in desorption and the exhausted energy is minimized.

As seen from the above, the ability to purify/separate feed streams of higher contaminant concentration and temperature, the use of shorter cycles and regeneration at lower temperature using lower thermal driving forces are all strategies that have the potential to improve efficiency and/or lower the cost of cyclic adsorption processes. These potential improvements would be revealed in the form of smaller vessels with less adsorbent, lower pressure drop across the adsorber in both the adsorption and desorption cycle steps and reduction in the amount and cost of the regeneration energy required.

However, in the context of the prior art, implementing any one or several of these strategies would generally result in an increase in the required purge rate for regeneration. The additional purge required may not be available for regeneration due to competing demands for product and/or alternate process streams, e.g. after-cooling of compressed feed. Even when available, increased purge rate is accompanied by increased pressure drop across the adsorber, the cost of which offsets some of the savings gained from the associated improvements.

OBJECTS OF THE INVENTION

It is an object of the invention to provide a method whereby regeneration of adsorbers using a small thermal driving force in conjunction with a low to moderate purge rate while minimizing the energy exhausted as waste may be accomplished.

It is a further object of the invention to reduce bed size through the use of shorter cycles while maintaining low temperature and reduced purge regeneration.

SUMMARY OF THE INVENTION

The invention involves a process for regenerating a sorbent bed wherein at least two thermal pulses are used to desorb adsorbed gases from adsorbent materials within the sorbent bed.

BRIEF DESCRIPTION OF THE DRAWINGS

Other objects, features and advantages will occur to those skilled in the art from the following description of the preferred embodiments and the accompanying drawings, in which:

FIGS. 1a–1c show a conventional single thermal pulse regeneration process.

DETAILED DESCRIPTION OF THE INVENTION

Figure 2A:
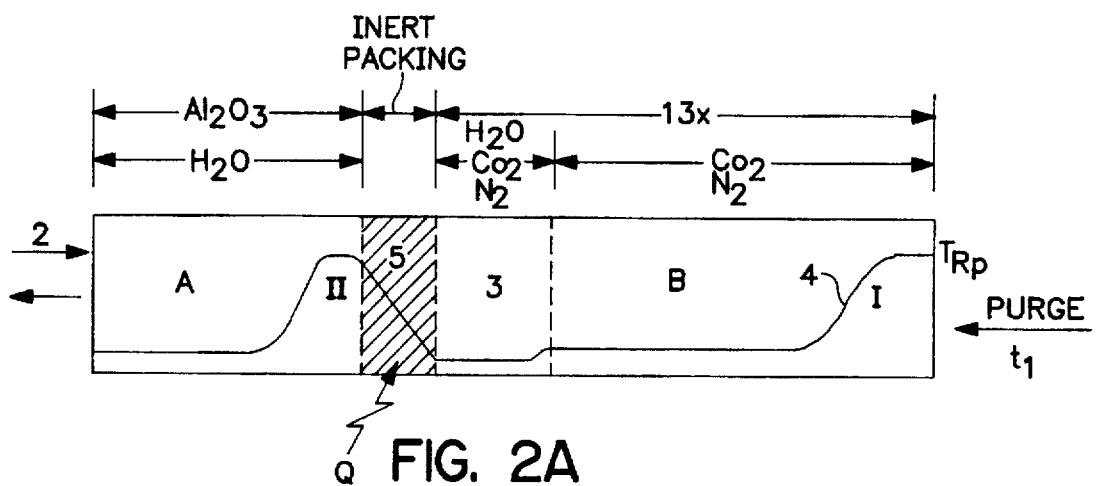
FIGS. 2a–2d shows a multi-thermal pulse regeneration according to the invention whereby two sections of the adsorbent bed are reactivated simultaneously by two heat fronts.

The invention is based upon the premise that different adsorbents/adsorbates have different requirements for regeneration (i.e. temperature, purge flow, purge composition and pressure). In a single pulse system, only one set of conditions for regeneration may be used for a given bed. The multi-pulse system of the present invention allows for tailoring of regeneration conditions for different adsorbent/ adsorbates within a given bed. Further, the current invention allows the pursuit of the aforementioned improvement strategies while maintaining or even reducing the purge flow rate. Finally, operating ranges may be expanded since smaller adsorbers can be operated with shorter cycles under process conditions or constraints which were previously unattainable.

In the present invention, the purge rate and time required to regenerate an adsorber are reduced by the application of multiple thermal pulses. Such pulses are inserted into the adsorber and into the process in a manner determined by the distribution and levels of adsorbates, the type of adsorbent (s) and the thermal driving force(s) available for regeneration. These multiple thermal pulses serve to reactivate various adsorber sections or adsorbent layers simultaneously, i.e. a parallel regeneration is affected. The reduction in purge rate resulting from multi-pulsed thermal regeneration enables higher efficiency process strategies such as the use of shorter regeneration cycles and smaller thermal regeneration driving forces.

A conventional single thermal pulse process is disclosed in FIGS. 1a–1c. As stated above, the purpose of this process is to regenerate a prepurifier bed by removing adsorbed contaminants such as $H_2O$ and $CO_2$, as well as $N_2$.

As shown in FIGS. 1a–1c, a typical bed 1 may be divided into at least two stages, through which feed air would flow in an adsorption step in a left to right direction as shown by arrow 2. First and second stages A and B comprise activated alumina ($Al_2O_1$) for adsorbing $H_2O$ and 13× molecular sieve for adsorbing $CO_2$, respectively. N, may also be adsorbed by 13×. A buffer area 3 exists between stages A and B. This buffer area adsorbs any remaining $H_2O$, as well as $CO_2$.

In the regeneration process at time t1, a single thermal hot purge $T_{HP}$ is introduced on a side of the bed opposite to where feed air would be introduced, and flows in a direction counter to what the feed air flow would be. The temperature of the purge $T_{HP}$ is greater than that of the adsorbent.

Most of the desorption occurs in a narrow zone of the adsorbent, over which a thermal gradient develops. This zone containing the gradient or "heat front" 4 moves through the bed as a thermal pulse leaving reactivated material behind at the elevated temperature.

After the heat front has traversed a portion of the bed, the hot purge is replaced by cool purge $T_{CP}$ as shown in FIG. 1b at times $t_2$. The cool purge serves to transfer the heat stored in the reactivated adsorbent to the remaining contaminated section of the adsorber, thereby desorbing more contaminants while leaving the reactivated adsorbent at the cool purge temperature. Over time $t_2$–$t_3$, the cool purge "pushes" the hot pulse across the bed as shown in FIGS. 1b–1c. The term "cool purge" implies a temperature below the hot purge, and usually at or near the ambient temperature. A process of the present invention, which allows for the simultaneous regeneration of multiple stages will now be discussed with reference to FIGS. 2a–2d.

FIG. 2a shows a bed substantially as shown in FIG. 1a, except that an optional heating zone 5 containing nonadsorbent material is shown.

As in FIG. 1a, a purge is introduced at a temperature elevated with respect to the adsorbent $T_{HP}$ to create a first thermal pulse. In addition however, energy as heat Q is introduced into the heating zone 5 to create a second thermal pulse. The two distinct thermal pulses move in a substantially simultaneous manner through the different sections of the adsorber.

Figure 2B:
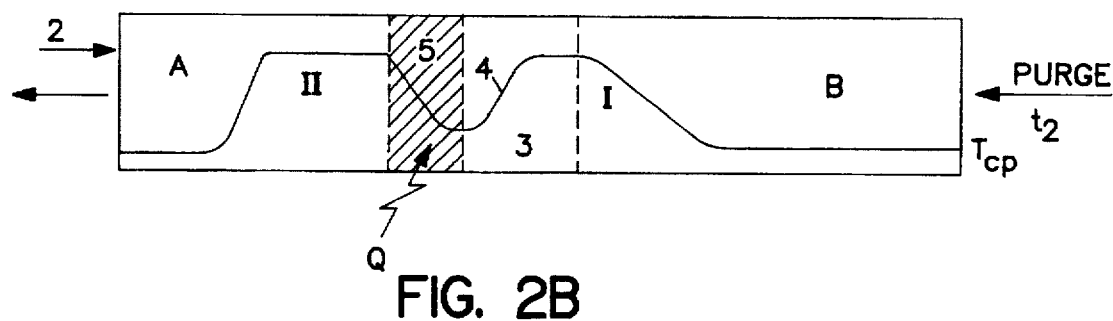
Figure 2C:
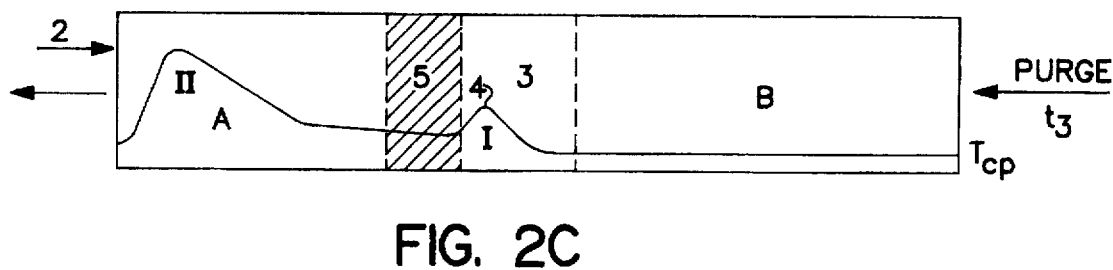
Figure 2D:
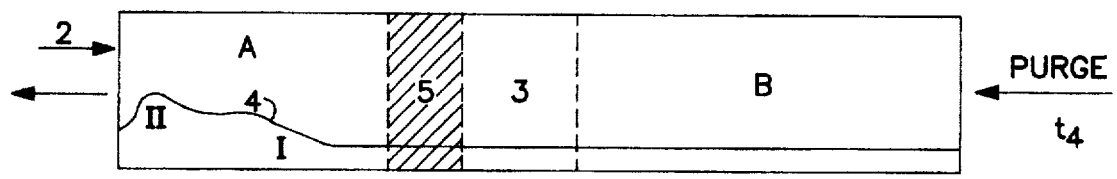

After the heat front of the first pulse 4 has traversed a portion of the bed, the hot purge is replaced by a cooler purge at temperature $T_{CP}$ as shown in FIGS. 2b–2d. The results is that each section experiences the successive steps of heating, desorption and cooling, to leave the entire bed reactivated, cooled and ready for a subsequent adsorption step.

The following examples compare the properties of a single thermal pulse with the present invention. These are considered to be illustrative only and nonlimiting.

EXAMPLES

Air purification prior to cryogenic separation in an 850 ton $O_2$/day plant has been chosen to illustrate the primary features of the present invention. The feed conditions of air at the adsorber inlet are summarized in Table 1. Each adsorber contains a layer of activated alumina followed by 13× molecular sieve. A two-bed system purifies the air in a simple five-step, twelve-hour cycle: adsorption (6.0 hr.), depressurization (0.25 hr.), countercurrent hot and cool purge steps (combined time 5.5 hr.) and repressurization (0.25 hr.). The process is operated in the conventional manner such that one bed is on stream producing purified air (adsorption) while the other bed undergoes the remaining steps in the cycle. This is a high purity process wherein $H_2O$ and $CO_2$ concentrations in the product air leaving the prepurifier must be less than 0.1 ppm and 0.25 ppm, respectively.

TABLE 1

| Feed Air Conditions | |
|---|---|
| Temperature (°F.) | 59 |
| Pressure (psia) | 93 |
| $H_2O$ conc. (ppm) | 2,900 |
| $CO_2$ conc. (ppm) | 500 |
| Air Flow (ncfm) | 38,750 |

This process was optimized for minimum waste regeneration energy for a hot purge temperature of 338° F. (purge pressure=18.6 psia) using the single thermal pulse concepts described above. The effect of reduced thermal driving force was then studied by lowering the hot purge temperature from 338° F. to 250° F. while maintaining both the purge rate and regeneration energy approximately constant. This was accomplished by lengthening the purge heating time at 250° F.

Unexpectedly, sufficient and stable reactivation could not be sustained. It was necessary to increase the purge-to-feed ratio (P/F) from 11.8% to 15.5% to achieve successful reactivation (case 3) as shown in Table II adjusting again the purge heating time to maintain total regeneration energy nearly constant as in cases 1 and 2. An explanation for these results can be found by analyzing the motion of the heat front.

TABLE II

Low Temperature Purge Study

| | Case 1 | Case 2 | Case 3 | Case 4 | Case 5 |
|---|---|---|---|---|---|
| thermal pulse | Single | Single | Single | Single | Dual |
| $T_{hp}$ (°F.) | 338 | 250 | 250 | 180 | 180 |
| P/F | 0.118 | 0.120 | 0.155 | 0.245 | 0.143 |
| Successful Regeneration | yes | no | yes | yes | yes |

The well-known constant transfer-zone approximation, while used often in adsorption analyses and rarely in desorption analyses, is applied here in the form of Equation (1) to estimate the speed of the heat front ($V_z$)

$$V_z = \frac{JC_{p_q}(\Delta T)}{C_{p_s}\rho_b(\Delta T) + \rho_b \Sigma \Delta H_i \Delta X_i} \quad (1)$$

where J is the purge rate, $\Delta T$ the thermal driving force, $\Delta H_i$ is the heat of adsorption for adsorbate i, $\Delta X_i$ is the adsorbate loading difference across the heat front, $\rho_b$ is the bulk density of the adsorbent, and $c_{p_s}$ and $c_{p_g}$ are the specific heats of the gas and solid, respectively. Equation (1) may be applied independently to different sections of the adsorber according to the distribution of adsorbed contaminants in the bed, e.g. the $H_2O$/alumina and the $CO_2/N_2$/13×layers A and B shown in FIG. 1. The total time (t) required for the heat front to traverse the adsorber is the sum of the times required to traverse the individual bed sections and can be approximated using Equation (2):

$$t = \left(\frac{L}{V_z}\right)_A + \left(\frac{L}{V_z}\right)_B \quad (2)$$

where $L_A$ and $L_B$ are the lengths of adsorber sections defined above. The application of Equations (1) and (2) to the first two cases in Table II resulted in predictions for the total required purge time of 4.5 hr. and 5.6 hr., respectively, with only 5.5 hr. being available for regeneration. Considering also the 0.5 hr. required for the purge to reach its maximum temperature level, it is clear from this analysis that the heat front travel in case 2 is insufficient to reactivate the amount of adsorbent necessary to contain the cyclic contaminant load. The distance that the heat front traveled in case 2 cannot be increased by lengthening the heating time as the additional heat would only be stored in the reactivated adsorbent and would never reach the area of the adsorbent where it is needed.

Equations (1) and (2) were rearranged to estimate the purge (P/F=26.%) rate required to regenerate the adsorber at a maximum temperature of 180° F. within the available 5.5 hr. step time. Successful and steady operation was achieved at a minimum P/F of 24.5% after several tests as shown for case 4 in Table II.

The results for cases 1–4 clearly show a purge rate limitation as the regeneration temperature (more directly the thermal driving force) is reduced. The required purge rate more than doubles while the regeneration energy remains nearly constant as the temperature is decreased from 338° F. to 180° F. (thermal driving force decreases by a factor of three).

This problem is overcome through the present invention by introducing multiple thermal pulses Q1, Q2 and Q3, etc. such that different sections of the adsorbent bed are reactivated simultaneously. By introducing heat intermediate to the alumina and 13× layers of the adsorber described above, two heat fronts are created and the two adsorbent layers are regenerated in parallel as described above and illustrated in FIG. 2.

Figure 3:
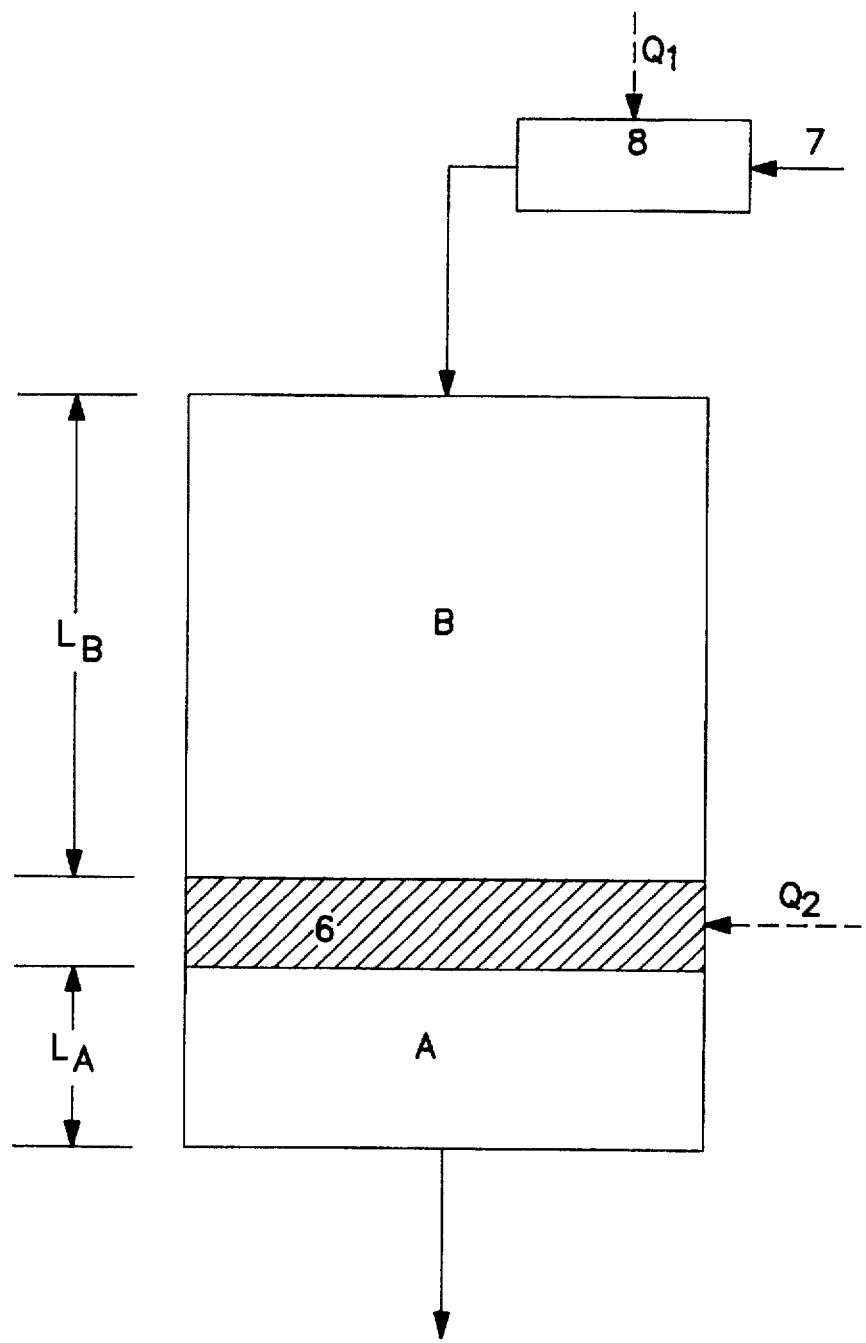
FIG. 3 shows one method by which multi-thermal pulse regeneration may be accomplished according to the invention.

These heat fronts or desorption zones can be introduced, for example, in a manner described in FIG. 3. In this example, stages A and B of adsorbent correspond to the activated alumina and molecular sieve, respectively. Adsorbates are approximately distributed such that $H_2O$ is adsorbed in stage A while $CO_2$ and $N_2$ are coadsorbed in B.

Energy $Q_2$ is provided to internal heater 6 which is deployed between the layers A and B. Purge 7 is first heated by energy $Q_1$ in heater 8 before entering the adsorber in layer B and reheated by energy $Q_2$ in heater 6 prior to entering layer A. Because desorption is induced in both layers simultaneously, two heat fronts develop and move through the respective layers as thermal pulses shown in FIGS. 2a–2d. Using the same conditions as in case 4, it has been demonstrated by case 5 in Table II that providing multi-pulses reduced the required purge rate by more than 40%. The regeneration energy was again maintained the same as in case 4, however, this energy is divided and introduced into the adsorber in case 5 at two distinct locations instead of one.

The heat fronts traverse their respective layers in characteristic times defined by Equations (3) and (4):

$$t_A = \left(\frac{L}{V_z}\right)_A \quad (3)$$

$$t_B = \left(\frac{L}{V_z}\right)_B \quad (4)$$

Ideally, the internal location for energy introduction is selected to achieve $t_A = t_B$, i. e. layers A and B are desorbed completely in the same time. This internal location is determined by combining Equations (1), (3) and (4). It is appreciated then that this location need not correspond to the interface between two different adsorbent types nor to the interface between various adsorbate distributions. In fact, the multi-pulsing concept can be applied with similar effectiveness to an adsorbent bed containing only a single adsorbate and/or adsorbent.

A further advantage of multi-pulsing is that it can be applied to null the cooling effect that occurs during depressurization preceding the regeneration step. This cooling effect in air purification processes results from the expansion of the gas and the rapid desorption of $N_2$ and, to a lesser extent, the slow desorption of $H_2O$. A cooling front is created in the depressurization step and continues its motion through the adsorber ahead of the heat front during the purge step in single pulse regeneration. This results in a reduced temperature in the contaminated zones of the adsorber which ultimately slows desorption and increases energy consumption. This effect is minimized by introducing energy internal to the adsorber at the beginning of the depressurization step. This also increases the effectiveness of the void gas as purge during this step. Therefore, it may be advantageous to initiate (or terminate) the multiple pulses at different times depending upon the requirements for regeneration.

Multi-pulsed regeneration can also be applied to reduce cycle time, thereby generating savings in the cost of the adsorber and its pressure drop. First, consider the effect of reducing the adsorption cycle for case 4 from 6.0 hr. to 1.0 hr. using only single pulse regeneration. The pressure changing steps are reduced to 5.0 min. each, leaving 50.0 min. total for the hot and cool purge steps. Although the cycle time is reduced by a factor of six, the bed size may only be decreased by a factor of three. The bed size does not scale directly with the cycle time due to the reduction in dynamic capacity at the shorter adsorption times, i.e. the adsorption mass transfer zones consume a larger fraction of the adsorbent bed in shorter cycles. The ratio of bed size to regeneration time is thus larger when compared to the longer cycle case. Therefore, the heat front velocity must be greater to affect stable reactivation, as is evident from Equations (1)–(3).

A summary of the single pulse, short cycle results are given in Table III as case 6. Compared to case 4, the shorter cycle does produce significant benefits in bed size and feed pressure drop, but at the expense of increasing the P/F from 24.5% to 40.0%.

It is doubtful that case 6 can be practiced for 180° F. regeneration, since the requirements for $N_2$ as product, D-20201 regeneration purge and feed cooling gases exceed $N_2$ availability.

By employing a dual thermal pulse to the short cycle described above, the required P/F rate is reduced to 26.0% for case 7 as shown in Table III. Thus, the purge rate is maintained near that of case 4, but significant improvements in the process can now be realized as a result of the shorter cycle and the multi-pulse regeneration, i.e. feed and purge pressure drops have been cut roughly by factors of four and three, respectively; bed size has been reduced by a factor of three. Although dynamic capacity for $H_2O$ decreases for the shorter cycles, this loss is not as great when the dual thermal pulse is applied. The shallow bed/short cycle regime that develops due to multi-pulsing also creates a very attractive opportunity to incorporate small adsorbent particles to reduce mass transfer zone lengths and increase dynamic capacity, e.g. particles as small as 0.5 mm can be utilized. The lower superficial velocities imposed by fluidization limits for smaller particles can be overcome by employing bed-restraining methods. Void gas losses during depressurization, while larger for the shorter cycles, remain manageable.

TABLE III

Advantages of Multi-pulsed Processes

| | Case 4 | Case 5 | Case 6 | Case 7 |
| --- | --- | --- | --- | --- |
| regen. heat pulse | Single | dual | single | dual |
| $T_{hp}$ (°F.) | 180 | 180 | 180 | 180 |
| P/F | 0.245 | 0.143 | 0.40 | 0.26 |
| ads. time (hr.) | 6.0 | 6.0 | 1.0 | 1.0 |
| $d_{bed}$ (m) | 2.8 | 2.8 | 0.92 | 0.75 |
| Feed ΔP (psi) | 1.38 | 1.38 | 0.45 | 0.36 |
| Purge ΔP (psi) | 0.64 | 0.31 | 0.51 | 0.21 |
| alumina dynamic capacity (g/g) | 0.16 | 0.16 | 0.085 | 0.098 |
| blowdown loss (%) | 0.08 | 0.08 | 0.3 | 0.29 |

The use of multiple thermal pulses for regeneration in adsorption processes provides tremendous flexibility for process efficiency and cost improvements, as well as for operating range extension. The largest benefits are likely to be realized when one or more of the following conditions exist: high product purity requirement, high contaminant levels in feed, high heats of adsorption, low to moderate purge availability, short cycles, low to moderate thermal driving force for regeneration, low regeneration temperature. Although the concept of multi-pulsed regeneration has been described using air purification examples, multi-pulsed regeneration is potentially applicable to any cyclic adsorption process, e.g. any drying processes, natural gas purification, etc. Furthermore, the concept is not limited to the use of two simultaneous heat fronts, as any number of pulses may be generated to reactivate adsorbent layers in parallel. More pulses tend to promote faster regeneration using less purge at lower thermal driving force.

It should be recognized that multi-pulsed regeneration may be practiced with:

a) uniformly distributed, layered or mixed adsorbent;
b) one or more adsorbents;
c) one or more contaminants in feed stream;
d) one or more adsorbed contaminants;
e) a pressure swing or at constant pressure;
f) axial, radial, or lateral flow adsorbers;
g) a plurality of beds;
h) multiple purge streams of different flow rate, temperature, pressure and/or purity;

Multi-pulsed regeneration is particularly well-suited to a three-bed process in which two beds undergo adsorption while the third bed is being regenerated. The inherently shorter regeneration time (less than one-half the time for adsorption) imposes a significantly increased demand upon purge rate; a condition that can be mitigated using multiple heat fronts.

Multi-pulsing regeneration has a wide potential applicability when viewed through the governing heat front motion equations. The purge rate (J) and thermal driving force (ΔT) may be selected to control the desorption time. Various layers or sections of the adsorber can be reactivated independently and in parallel by applying combinations of purge rate and regeneration temperature. Examples illustrated in FIGS. 4a–4f, and described in the corresponding paragraphs below, represent a cross section of the variety of potential means of deploying multiple heat fronts.

Figure 4A:
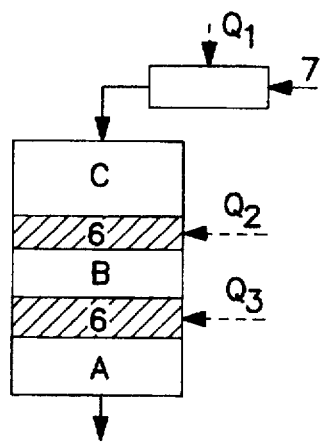
FIGS. 4a–4f show six methods by which multiple heat fronts may be deployed according to the invention.

FIG. 4a shows that energy may be inserted at one or more internal heater locations 6 such that two or more heat fronts are created. The adsorber bed is virtually subdivided into as many simultaneously desorbing segments as the number of heat fronts generated. The locations of energy insertion can be selected to affect a desired reactivation time according to the amount adsorbed and the adsorbate/adsorbent characteristics.

Figure 4B:
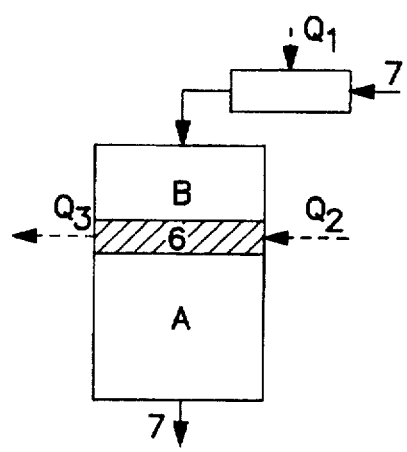

FIG. 4b shows that when a secondary fluid heated by energy $Q_2$ is used to transfer energy into the adsorber for reactivation, the same heat exchanger 6 may be employed during the adsorption step to cool the feed stream 7 in the inlet or at intermediate adsorber locations. Such cooling serves to remove heat $Q_3$ generated from adsorption in upstream sections "A" of the bed before it passes into downstream section "B". Because capacity for contaminants is lower at elevated bed temperatures, the removal of heat $Q_3$ effectively increases the dynamic capacity of the downstream section "B" of adsorbent with respect to the remaining contaminants.

Figure 4C:
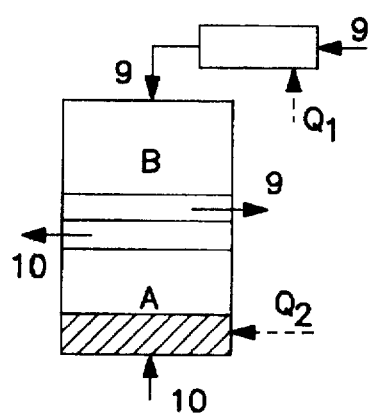

FIG. 4c represents the use of two independent purge streams (9 & 10) and heaters and the generation of two heat fronts that move in opposite directions through different subsections of the adsorber. $Q_2$ is positioned to input energy directly into the section of highest contaminant loading within the adsorber where the largest desorption heat is required. Purge streams 9 and 10 do not comingle.

Figure 4D:
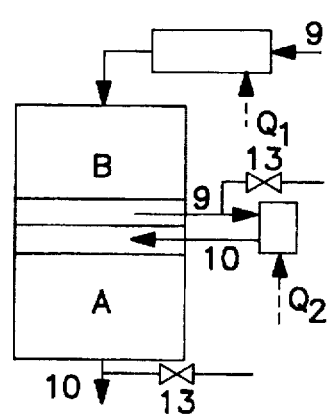

FIG. 4d shows an embodiment wherein external reheat Q of the purge 9 at an intermediate point in its travel through the bed may be desirable when an embedded heat exchanger 6 is not feasible, when the heat exchanger is to be shared between other units in the process or when the contaminants are to be removed from the purge stream at an intermediate point in the adsorber. In this respect, it is noted that during desorption, contaminants usually are concentrated in the purge gas stream so that only a portion of the total purge contains contaminants. If the purge stream is to be recycled (e.g. to another bed), or if it is undesirable to introduce the high concentration stream of contaminants into section A where they may be readsorbed, then venting through vents 13 may be used to selectively rid the stream of most of the contaminants while preserving some of the purge gas for other uses. In some situations, contaminants may be recovered.

Figure 4E:
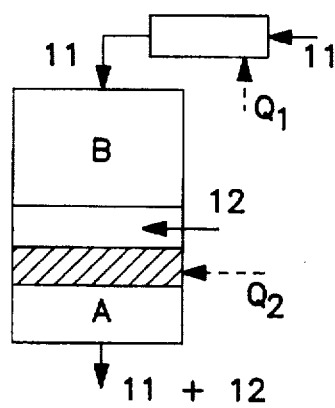

Multiple purge streams 11 and 12 with external energy addition Q1 and internal energy addition $Q_2$ are shown in FIG. 4e. The purge rate to section A increases due to the combining of streams 11 and 12.

In addition to the rationale derived from the heat front velocity relationship, this method is also useful when high purity purge (stream 11) is in limited supply such that a lower purity purge (stream 12) can be used either alone or to supplement stream 11 for reactivation of section A of the bed, without contaminating section B.

Figure 4F:
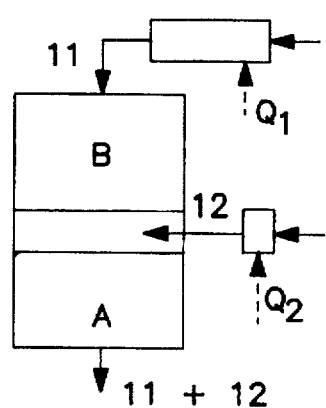

FIG. 4f shows a process that provides similar advantages as 4e except that energy Q, is added to heat the purge 12 external to the bed. In this embodiment the Q2 is added to purge stream 12 only.

In the above examples, the primary purge streams (7, 9 and 11) are shown as being heated by energy addition $Q_1$. It is intended to convey only that these purge streams be supplied to the adsorbent at a temperature greater than that of the adsorbent. How such heated purges are obtained is not essential to the practice of this invention, but some embodiments may include, for example, direct means such as conventional gas fired, electric or steam heaters, and indirect methods such as microwave energy or adsorption. In addition, the purge may be routed from other processes or from within this process. This same argument may be applied to the heating of purge streams 10 and 12. While in some embodiments a heat exchanger or heater has been shown to be embedded inside the adsorber, the invention can be practiced using any means that results in the deliberate increase in temperature of the purge passing this location in the adsorber.

The internal heating means may be embedded within adsorbent or within a layer of inert material to promote rapid heat conduction over the adsorber cross section.

The adsorbents may be contained in a single vessel as shown in FIGS. 3 and 4a–4f, or may be distributed in multiple vessels to facilitate heating or flow augmentation, for example, of the purge stream as it travels between adsorbent layers in the adsorber, i.e. a given adsorber may consist of several vessels.

Multi-pulsing regeneration can be applied to promote the concentrating of contaminants in the exhaust stream. This feature can be applied to recover impurities, as well as to recover/recycle the purge gas. FIGS. 4c and 4d represent configurations of the invention in which contaminant recovery or selective venting of contaminants could be affected.

Multi-thermal pulsing can also be applied to generate a thermal-assist for PSA prepurification. The basic method is the same as described above. The major benefits derived include increased dynamic capacity of the adsorbents, increased cycle time, and the reduction of purge amount. Additional improvements are possible by combining other process enhancements with multi-pulsing as follows: control of cycle time according to feed air temperature, cooling of feed, optimization of adsorbent particle size(s), and the use of a storage tank for repressurization gas.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A process for regenerating a sorbent bed the process comprising the steps of:
    a) providing a sorbent bed having first and second ends and one or more adsorbent materials disposed therebetween, said one or more adsorbent materials having selected gases adsorbed thereon, wherein said selected gases are provided from a feed gas stream;
    b) providing a first thermal pulse by:
        i) adding heat energy $Q_1$ to said adsorbent bed so as to create a first heat front that traverses a first region of said adsorbent bed;
        ii) providing a first cooling front that traverses said first region of said adsorbent bed, wherein said first cooling front is initiated by terminating the addition of said heat energy $Q_1$ before said first heat front has completely traversed said first region, and wherein
        iii) said first cooling front pushes said first heat front through said first region such that said first thermal pulse regenerates all of said first region;
    c) providing at least one additional thermal pulse by:
        i) introducing heat energy $Q_2$ into said bed at one or more additional regions between said ends which have not been regenerated by said first thermal pulse so as to create one or more additional heat fronts that traverse said one or more additional regions;
        ii) providing one or more additional cooling fronts that traverse said one or more additional regions of said adsorbent bed; wherein said one or more additional cooling fronts are initiated by terminating said introduction of said heat energy $Q_2$ before said one or more additional heat fronts have completely traversed said one or more additional regions, and wherein
        iii) said one or more additional cooling fronts push said one or more additional heat fronts through said one or more additional regions such that said one or more additional thermal pulses regenerate all of said one or more additional regions.

2. The process of claim 1, wherein said steps "b" and "c" occur substantially simultaneously.

3. The process of claim 1, wherein regenerations resulting from said steps "b" and "c" occur substantially simultaneously.

4. The process of claim 1, wherein each of said one or more adsorbent materials have different affinities for said selected gases.

5. The process of claim 4, wherein said one or more adsorbent materials include at least a first material having an affinity for water, and a second material having an affinity for $CO_2$, and wherein said selected gases are water and $CO_2$.

6. The process of claim 5, wherein said at least one additional thermal pulse is introduced into said region of said bed comprising the material having an affinity for water.

7. The process of claim 5, wherein said material having an affinity for water is activated alumina, and said material having an affinity for $CO_2$ is a molecular sieve.

8. The process of claim 1, wherein each of said one or more adsorbent materials are separated into different regions of said bed.

9. The process of claim 1, wherein said heat energy $Q_1$ is provided from a source either within said bed or external to said bed, and said heat energy $Q_2$ is provided from a source either within said bed or external to said bed.

10. The process of claim 9, wherein the source for said heat energy $Q_2$ is a heat exchanger within said bed.

11. The process of claim 10, wherein the heat exchanger is used during an adsorption process to cool said feed gas stream at a feed inlet or at an intermediate adsorber location.

12. The process of claim 1, wherein at least one of said heat energy $Q_1$ and said heat energy $Q_2$ is provided as a heated purge stream.

13. The process of claim 12, wherein said first thermal pulse and said at least one additional thermal pulse do not interact with each other.

14. The process of claim 12, wherein said first thermal pulse and said at least one additional thermal pulse are provided at either one of or both of said first and second ends of said sorbent bed.

15. The process of claim 12, wherein at least a portion of said heated purge stream is partially vented from the sorbent bed.

16. The process of claim 1, wherein said first thermal pulse and said at least one additional thermal pulse are combined.

17. The process of claim 1, wherein each of said thermal pulses desorbs a selected region of said bed, and wherein said pulses are provided in a manner such that the time required to desorb each selected region is substantially the same.

18. A process for regenerating a sorbent bed the process comprising:
   a) providing a sorbent bed having first and second ends and one or more adsorbent materials disposed therebetween, said one or more adsorbent materials having selected gases adsorbed thereon, wherein said selected gases are provided from a feed gas stream;
   b) creating a first thermal pulse to regenerate said bed by:
      i) providing a first heated purge stream to said bed to create a first heat front;
      ii) allowing said first heat front to traverse a region of said bed, to regenerate said selected gases from said one or more adsorbent materials in said region;
      iii) before said first heat front has completely traversed said region of said bed, replacing said first heated purge stream with one or more purge streams that are at a cooler temperature than said first heated purge stream, to create a cooling front that pushes said first heat front across those portions of said first region that have not been regenerated by said first heat front to complete regeneration in said first region and to cool said first region that has been regenerated;
   c) creating at least one additional thermal pulse by:
      i) providing one or more additional heated purge streams at one or more additional regions to create one or more additional heat fronts;
      ii) allowing said one or more additional heat fronts to traverse one or more additional regions of said bed, to regenerate said one or more additional regions;
      iii) before said one or more additional heat fronts have completely traversed said one or more additional regions, providing one or more additional purge streams that are at a cooler temperature than said one or more additional heated purge streams so as to create one or more cooling fronts that push said one or more heat fronts across those one or more additional regions of said bed that have not been regenerated by said one or more additional heat fronts to complete regeneration of said one or more additional regions and to cool said one or more additional regions that have been regenerated;

wherein all of said adsorbent bed is substantially regenerated.

19. The process according to claim 18, wherein said first heated purge stream and said one or more purge streams that are at a cooler temperature than said first heated purge stream flow in a direction that is countercurrent to a direction at which said feed stream flows.

20. The process according to claim 19, wherein said one or more additional heated purge streams and said one or more additional purge streams that are at a cooler temperature than said one or more heated purge streams flow in a direction that is countercurrent to a direction at which said feed stream flows.

21. The process of claim 18, wherein said one or more purge streams that are at a cooler temperature than said first purge stream comprise two or more purge streams that are provided at successively cooler temperatures.

22. The process of claim 18, wherein the temperature of a last purge stream of said one or more purge streams that are at a cooler temperature than said one or more additional heated purge streams, is the temperature at which said selected gases were adsorbed.

* * * * *